United States Patent [19]

Wolf

[11] 4,353,884
[45] Oct. 12, 1982

[54] METHOD FOR SYNTHESIZING BORACITIES

[75] Inventor: Gary A. Wolf, Kennewick, Wash.

[73] Assignee: The United States of America as represented by the United States Department of Energy, Washington, D.C.

[21] Appl. No.: 310,247

[22] Filed: Oct. 9, 1981

[51] Int. Cl.$^3$ ............................................ C01B 35/06
[52] U.S. Cl. .................................................... 423/277
[58] Field of Search ......................................... 423/277

[56] References Cited

U.S. PATENT DOCUMENTS 3,384,447 5/1968 Schmid ........................... 423/277 X
4,243,642 1/1981 Deleino ............................... 423/277

OTHER PUBLICATIONS

Jona, "Prep. & Dielectric Prop. of Syn. Boracite-Like Comp." J. Phys. Chem.; vol. 63, 1959, pp. 1750–1752.

*Primary Examiner*—G. O. Peters
*Attorney, Agent, or Firm*—Robert Southworth, III; Richard E. Constant; Richard G. Besha

[57] ABSTRACT

A method for producing boracites is disclosed in which a solution of divalent metal acetate, boric acid, and halogen acid is evaporated to dryness and the resulting solid is heated in an inert atmosphere under pressure.

4 Claims, No Drawings

METHOD FOR SYNTHESIZING BORACITIES

This invention relates to a new and improved method for the synthesis of boracites. The United States Government has rights in this invention pursuant to DOE Contract DE-AC06-77RLO 1030.

BACKGROUND OF THE INVENTION

Boracites are a class of compounds of the general formula $M_3B_7O_{13}X$ where M is a divalent metal and X is a halide.

Boracites exhibit pyroelectric and ferroelectric properties and are useful, for example, as infrared detectors. They also have been proposed for the long-term storage of radioactive iodine-129.

In the past the boracites have been synthesized generally by vapor transport methods, for example, by the method as described by Schmidt, H. J., Phys. Chem. Solids 26, 973, 1965 or by hydrothermal methods, for example, as described by Delfino in U.S. Pat. No. 4,243,642 which is incorporated herein by reference. However, these methods have the disadvantage of producing low yields, requiring long reaction times, or causing the boracites to be contaminated by complex metal borates.

SUMMARY OF THE INVENTION

It is an object of this invention to provide a new and improved method for the synthesis of boracites.

It is a further object of this invention to provide a method for the synthesis of boracites which produces improved yields and thereby a product free of complex metal borate contamination.

It is a still further object of this invention to provide a method for the synthesis of boracites which is less time-consuming.

According to the invention, the boracites are prepared by dissolving stoichiometric amounts of divalent metal acetate, boric acid, and halogen acid in water. The solution is evaporated to dryness and the resulting solids are ground to a free-flowing powder. After grinding, the powder is loaded into a graphite die, loaded to a high pressure, and heated in inert atmosphere. This heating may be carried out at a pressure of about 2250 psi and a temperature of about 650° C. for about 20 minutes.

The invention will now be described in greater detail with reference to the following example.

EXAMPLE 36.07 g of $H_3BO_3$, 54.87 g of Zn $(CH_3COO)_2$, and 66.7 ml of 1.24 M HCl were added to 400 ml of water and allowed to dissolve. This solution was dried and the residual solid was ground to a powder. 25 g of powder were loaded into a 1½ inch diameter graphite die. The die was loaded to 4000 lbs. force and heated to approximately 650° C. for 20 minutes in a graphite furnace having a helium atmosphere. The resulting product was characterized by X-Ray diffraction and matched the Joint Committee on Powder Diffraction Standards standard PDF #27-284 which corresponds to $Zn_3B_7O_{13}Cl$.

From the foregoing example, those skilled in the art will be enabled to synthesize other analagous compounds. Other boracite type minerals with which the method of the invention may be applied include $Mg_3B_7O_{13}Cl$, $Fe_3B_7O_{13}I$, $Fe_3B_7O_{13}Br$, $Fe_3B_7O_{13}Cl$, $Ni_3B_7O_{13}I$, $Co_3B_7O_{13}Cl$, $Cu_3B_7O_{13}Cl$, and mixed compounds such as $Mn_{2.9}Fe_{0.09}Mg_{0.01}B_7O_{13}Cl$. In general terms, the method of this invention may be applied to any divalent metal (and mixtures thereof) and any halogen.

What is claimed is:

1. A method for the production of boracites of the formula $M_3B_7O_{13}X$ wherein M is a divalent metal and X is a halogen, comprising:
    (a) dissolving $M(CH_3COO)_2$, $H_3BO_3$, and HX in water;
    (b) evaporating the solution from step (a) to dryness;
    (c) heating any solid residue from step (b) under pressure in an inert atmosphere.

2. The method of claim 1 wherein M is Mg, Cr, Mn, Fe, Co, Ni, Cu or Zn and X is Cl, Br, or I.

3. The method of claim 1 wherein M is Zn and X is Cl.

4. The method of claim 1 wherein step (c) is conducted at about 2250 psi and about 650° C. for about 20 minutes.

* * * * *